(12) United States Patent
Teng

(10) Patent No.: US 7,705,862 B1
(45) Date of Patent: Apr. 27, 2010

(54) SYSTEM AND METHOD FOR IMPROVED KEYSTONE CORRECTION

(75) Inventor: Tianbing Brian Teng, Beaverton, OR (US)

(73) Assignee: Pixelworks, Inc., Tualatin, OR (US)

(*) Notice: Subject to any disclaimer, the term of this patent is extended or adjusted under 35 U.S.C. 154(b) by 471 days.

(21) Appl. No.: 11/532,358

(22) Filed: Sep. 15, 2006

Related U.S. Application Data

(63) Continuation-in-part of application No. 10/753,833, filed on Jan. 5, 2004, now abandoned, and a continuation-in-part of application No. 10/723,002, filed on Nov. 26, 2003, now Pat. No. 7,380,946.

(51) Int. Cl.
*G09G 5/00* (2006.01)

(52) U.S. Cl. ...................................... 345/647

(58) Field of Classification Search ................ 345/647; 715/723, 721, 719, 733
See application file for complete search history.

(56) References Cited

U.S. PATENT DOCUMENTS

| | | | |
|---|---|---|---|
| 5,355,188 A | 10/1994 | Biles et al. | |
| 5,720,539 A | 2/1998 | Woo | |
| 6,056,408 A | 5/2000 | Kobayashi | |
| 6,169,535 B1 | 1/2001 | Lee | |
| 6,289,735 B1 | 9/2001 | Dister | |
| 6,305,805 B1 | 10/2001 | Leibenow | |
| 6,310,662 B1 | 10/2001 | Sunakawa et al. | |
| 6,339,434 B1 * | 1/2002 | West et al. | 345/667 |
| 6,367,933 B1 * | 4/2002 | Chen et al. | 353/69 |
| 6,520,547 B2 | 2/2003 | Robinson | |
| 6,520,646 B2 | 2/2003 | Rodriquez et al. | |
| 6,520,647 B2 | 2/2003 | Raskar | |
| 6,592,228 B1 | 7/2003 | Kawashima et al. | |
| 6,611,260 B1 | 8/2003 | Greenberg et al. | |
| 6,686,973 B2 | 2/2004 | Su | |
| 6,793,347 B2 | 9/2004 | Morishita | |
| 6,836,298 B2 | 12/2004 | Song et al. | |
| 6,843,563 B2 | 1/2005 | Richardson | |
| 6,843,569 B2 | 1/2005 | Hirao et al. | |
| 6,846,081 B2 | 1/2005 | Mochizuki et al. | |
| 6,867,753 B2 | 3/2005 | Chinthammit et al. | |
| 6,877,863 B2 | 4/2005 | Wood et al. | |
| 6,962,417 B1 | 11/2005 | Teng | |
| 6,963,348 B2 | 11/2005 | Diamond et al. | |
| 6,974,217 B2 | 12/2005 | Kimura et al. | |
| 6,997,563 B1 | 2/2006 | Wang | |
| 7,175,286 B1 | 2/2007 | Wang et al. | |
| 2001/0000300 A1 | 4/2001 | Haile-mariam | |
| 2002/0008697 A1 | 1/2002 | Deering | |
| 2002/0060754 A1 | 5/2002 | Takeuchi | |
| 2002/0063726 A1 | 5/2002 | Jouppi | |

(Continued)

*Primary Examiner*—Ulka Chauhan
*Assistant Examiner*—Donna J Ricks
(74) *Attorney, Agent, or Firm*—Marger Johnson & McCollom, P.C.

(57) ABSTRACT

I describe and claim a system and method for improved keystone correction. The method comprising identifying input values associated with an image projected on the projection surface, the input values including one or more centerpoints on edges of a distorted projection of the image and including a plurality of corners within the distorted projection of the image, the corners corresponding to an undistorted projection of the image, determining one or more keystone scaling values responsive to the identifying, and predistorting the image responsive to the determining, the predistorted image exhibiting no distortion and aligning with the plurality of corners when projected on the projection surface.

30 Claims, 7 Drawing Sheets

U.S. PATENT DOCUMENTS

| | | |
|---|---|---|
| 2002/0089651 A1 * | 7/2002 | Ejiri et al. .................... 353/69 |
| 2002/0109668 A1 | 8/2002 | Rosenberg et al. |
| 2003/0222892 A1 * | 12/2003 | Diamond et al. ............ 345/647 |
| 2003/0234797 A1 | 12/2003 | Williams et al. |
| 2004/0036844 A1 | 2/2004 | Wood |
| 2004/0095317 A1 | 5/2004 | Zhang et al. |
| 2005/0168705 A1 | 8/2005 | Li et al. |
| 2006/0203207 A1 | 9/2006 | Ikeda et al. |
| 2006/0204125 A1 | 9/2006 | Kempf et al. |

* cited by examiner

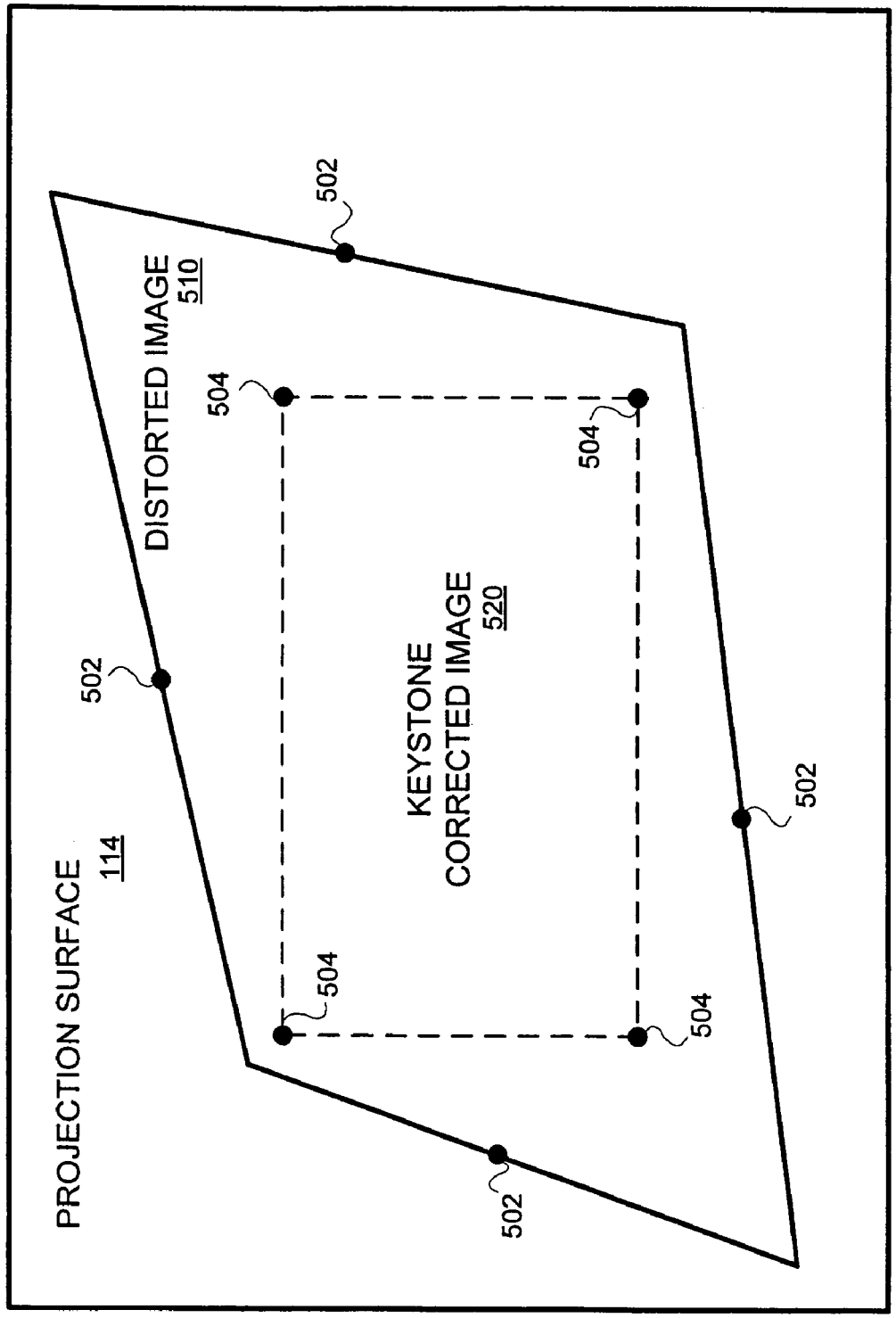

SYSTEM AND METHOD FOR IMPROVED KEYSTONE CORRECTION

RELATED APPLICATIONS

This application is a continuation-in-part of U.S. patent application Ser. Nos. 10/723,002, filed Nov. 26, 2003, 10/753,833, filed Jan. 5, 2004, and 10/832,488, filed Apr. 26, 2004. U.S. patent application Ser. Nos. 10/723,002 and 10/753,833 claim priority from U.S. provisional patent application 60/443,422, filed Jan. 28, 2003. U.S. patent application Ser. No. 10/832,488 claims priority from U.S. patent application Ser. No. 10/753,833, which claims priority to U.S. provisional patent application 60/443,422 filed Jan. 28, 2003. We incorporate the all of these applications in their entirety.

FIELD OF THE INVENTION

This invention relates to image projection and, more specifically, to an improved system and method of correcting keystone distortion of projected images.

BACKGROUND OF THE INVENTION

Projection systems are commonly used in academic, business, and personal environments to project images on screens or walls. The display of these projected images is dependent upon the orientation of the projection systems relative to the screens or walls. For instance, when a projection system is not oriented perpendicularly to a screen, the shape of the image will often appear stretched, deformed, or otherwise misshapen. This distortion of the projected image is often referred to as keystoning, since the shape of distorted image typically resembles a trapezoid or keystone.

There are several ways to correct keystone distortion. Projection systems might, for example, include optics that compensate for keystone distortion. These optics, however, are costly and prone to dust collection that degrades the quality of the projected images. Projection systems might also include gauges used to manually adjust the projected image to eliminate or minimize keystone distortion. These manual adjustments however tend to move the projected image off of the screen or wall and are typically time consuming, cumbersome, and generally an unwelcome set up complication.

Most projection systems additionally include signal processing circuits, for example, to oppositely distort the image to compensate for keystone distortion prior to projecting the image. These signal processing circuits typically distort the image according to distortion values pre-calculated from 100 or more points of the image. Although this technique may alleviate most, if not all, keystone distortion, it is complicated to set-up or recalibrate the projection system. For example, when the projection system is reoriented or repositioned, the system needs to identify new points of the image and recalculate the distortion values, which often requires floating point processes that exceed real time system capability. These complex pre-calculations result in the lack of real time distortion value calculations, which hinder the incorporation of advance functionality into the projection systems, such as image zoom and lens replacement, and impede projection system mobility. Accordingly, a need remains for a system and method for improved keystone correction.

BRIEF DESCRIPTION OF THE DRAWINGS

The foregoing and other objects, features, and advantages of the invention will become more readily apparent from the following detailed description of embodiments that proceed with reference to the following drawings.

FIGS. 5A-5C are graphical diagrams illustrating the input values shown in FIG. 3.

DESCRIPTION OF THE INVENTION

Figure 1:
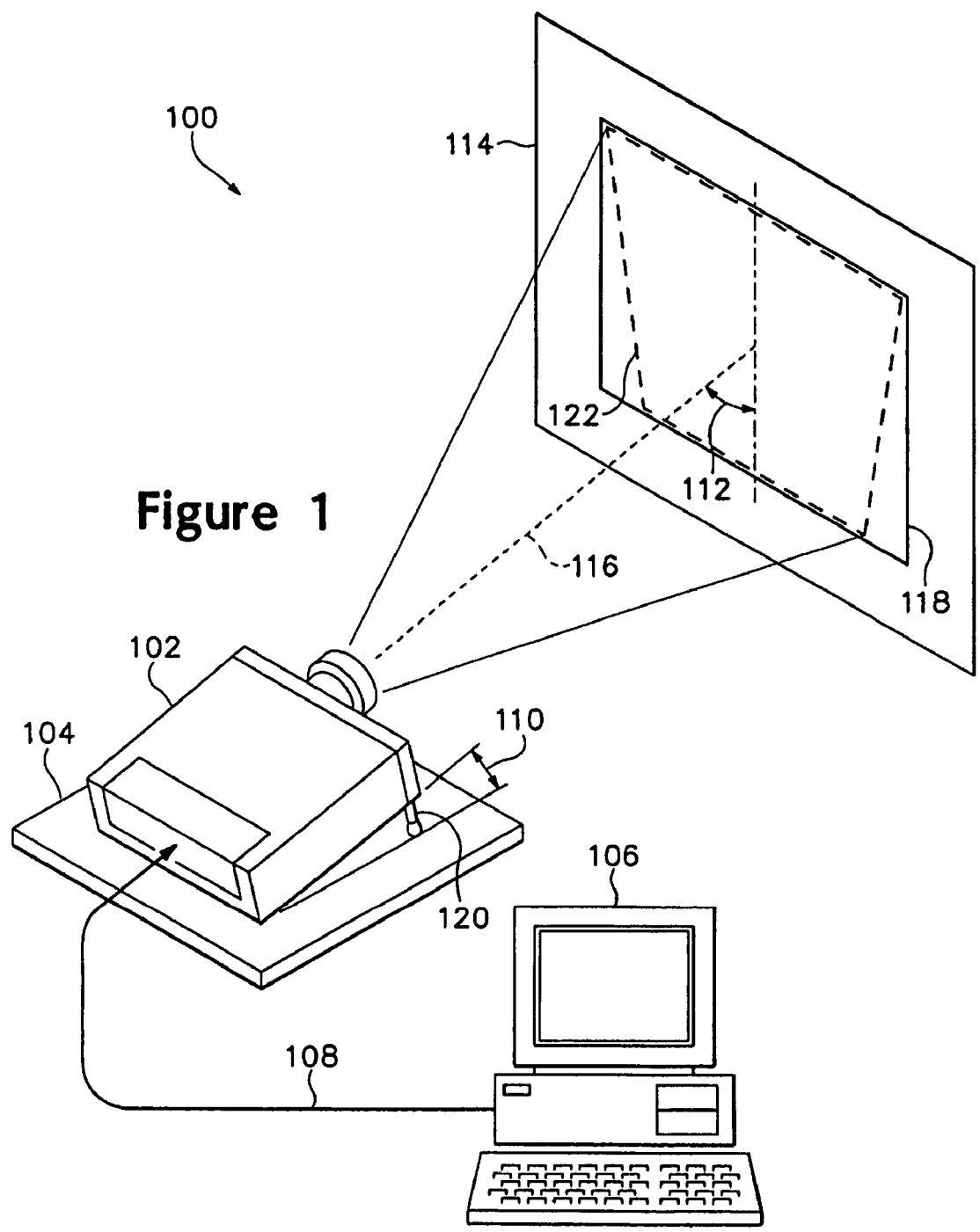
FIG. 1 is a diagram of a projection system.

FIG. 1 is a diagram of a projection system 100 useful with embodiments of the invention. Referring to FIG. 1, a projection system 100 includes a projector 102 positioned on a surface 104. The surface 104 is typically a desk or tabletop. An elevator 120 protrudes from the bottom sides of the projector 102 creating an angle 110 between the surface 104 and the projector 102. Only one elevator 120 is visible in FIG. 1 although a person of reasonable skill in the art should understand that a plurality of elevators 120 might be employed in the system 100. The angle 110 varies depending on the position of the elevator 120. The elevator 120 tilts the position of the projector 102 relative to the surface 104 such that projected image 118 moves up or down on a projection surface 114, increasing or decreasing the angle 110. The projection surface 114 might be a wall, screen, or any other surface capable of displaying a projected image 118.

The projector 102 manipulates image signals 108 it receives from an image source, i.e., a personal computer 106 or the like. A person of reasonable skill in the art should recognize that the projector 102 might receive different types of image signals, e.g., digital or analog signals, from the personal computer 106. The image signals 108 represent still, partial, or full motion images of the type rendered by the personal computer 106.

The projector 102 casts the image signals 108 onto the projection surface 114. The resulting projected image 118 centers about a projection axis 116. An angle 112 exists between the projection axis 116 and the projection surface 114. The angle 112 changes responsive to changes in the angle 110.

The projected image 118 may be substantially undistorted if the projection axis 116 is perpendicular to the projection surface 114. That is, the image 118 may be undistorted when the angle 112 is 90 degrees. Likewise, the projected image 118 distorts when the projection axis 116 is not perpendicular to the projection surface 114. This distortion is termed keystone distortion (or keystoning) because the image may appear wider at the top than at the bottom as shown in the jagged lined image 122. The projector 102, however, includes keystone correction functionality to pre-distort the image data 108, so that the projected image 118 appears undistorted when projected onto projection surface 114. Embodiments of the projection system 100 and the keystone correction functionality will be discussed below in greater detail.

Figure 2:
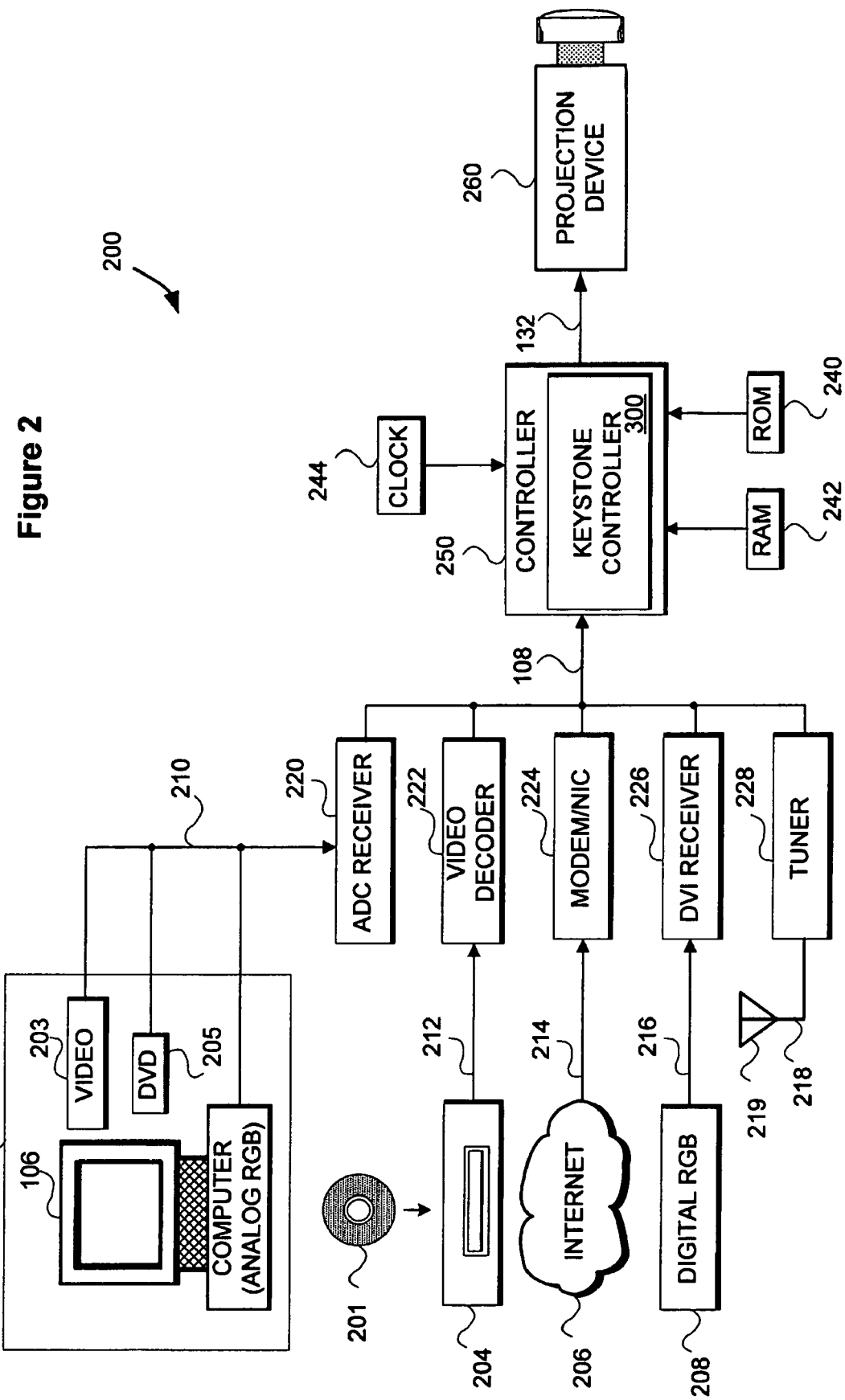
FIG. 2 is a block diagram of a projection system.

FIG. 2 is a block diagram of a projection system 200 according to an embodiment of the present invention. Referring to FIG. 2, the system 200 is capable of projecting an image data 132 on a projection surface 114 (FIG. 1). The system 200 includes a receiver 220 for receiving an analog image data signal 210, e.g., an RGB signal, from a source 202 (e.g., a computer 106, a video player 203 such as a VCR, or a DVD player 205). The receiver 220 might be an analog-todigital converter (ADC) or the like. The source 202 might be a personal computer or the like. The receiver 220 converts the analog image data signal 210 into digital image data 108 and provides it to the controller 250.

Likewise, a video receiver or decoder 222 decodes an analog video signal 212 from a video source 204 that reads information stored on a disc 201 such as a CD or a DVD. The video source 204 might be a video camcorder and the like. The decoder 222 converts the analog video signal 212 into digital image data 108 and provides it to the controller 250.

A modem or network interface card (NIC) 224 receives digital data 214 from a global computer network 206 such as the Internet®. The modem 224 provides digital image data 108 to the controller 250.

A Digital Visual Interface (DVI) receiver 226 receives digital RGB signals 216 from a digital RGB source 208. The DVI receiver 226 provides digital image data 108 to the controller 250. A person of reasonable skill in the art should recognize other sources and other converters come within the scope of the present invention, such as a tuner 228 that receives a television broadcast signal 218 from an antenna 219 and provides digital image data 108 to the controller 250, for example.

The controller 250 generates projection data 132 by manipulating the digital image data 108. The controller 250 provides the projection data 132 to projection device 260. The projection device 260 is any device capable of projecting the projection data 132 to a projection surface 114 (FIG. 1). The optics and electronics necessary to project the projection data 132 are well known to those of reasonable skill in the art.

The controller 250 may scale the digital image data 108 for proper projection by the projection device 260 using a variety of techniques including pixel replication, spatial and temporal interpolation, digital signal filtering and processing, and the like. The controller 250 may include a keystone controller 300 to pre-distort the digital image data 108 to correct keystone distortion that would appear when the projection data is displayed by the projection device 260. Embodiments of the keystone controller 300 will be described below in greater detail.

In another embodiment, the controller 250 might additionally change the resolution of the digital image data 108, changing the frame rate and/or pixel rate encoded in the digital image data 108. A person of reasonable skill in the art should recognize that the controller 250 manipulates the digital image data 108 and provides projection data 132 to a projection device 260 for image projection.

Read-only (ROM) and random access (RAM) memories 240 and 242, respectively, are coupled to the display system controller 250 and store bitmaps, FIR filter coefficients, and the like. A person of reasonable skill in the art should recognize that the ROM and RAM memories 240 and 242, respectively, might be of any type or size depending on the application, cost, and other system constraints. A person of reasonable skill in the art should recognize that the ROM and RAM memories 240 and 242 might not be included in the system 200. A person of reasonable skill in the art should recognize that the ROM and RAM memories 240 and 242 might be external or internal to the controller 250. Clock 244 controls timing associated with various operations of the controller 250. A person of reasonable skill in the art should recognize that the projector 102 might house all or part of the projection system 202, e.g., the controller 250, clock 244, RAM 242, ROM 240, projection device 260, as well as the optics and electronics necessary to project the projection data 132.

Figure 3:
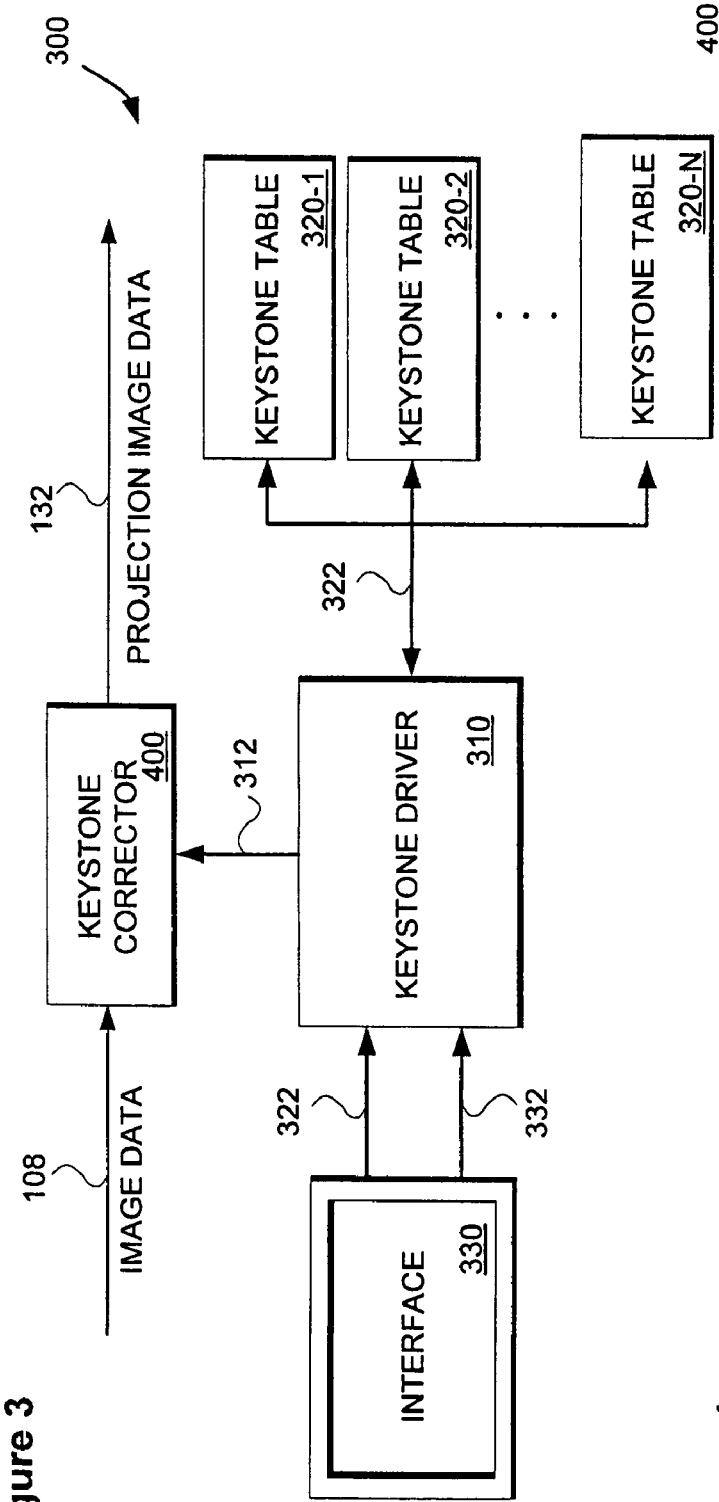
FIG. 3 is a block diagram embodiment of the controller shown in FIG. 2.

FIG. 3 is a block diagram embodiment of the keystone controller 300 shown in FIG. 2. Referring to FIG. 3, the keystone controller 300 includes a keystone corrector 400 to generate the projection image data 132 from the image data 108. The keystone corrector 400 may pre-distort the image date 108 according to keystone scaling values 312 from a keystone driver 310 to generate the projection image data 132. The keystone corrector 400 may then provide the projection image data 132 to the projection device 260 (FIG. 2) for display on the projection surface 114 (FIG. 1).

Figure 4:
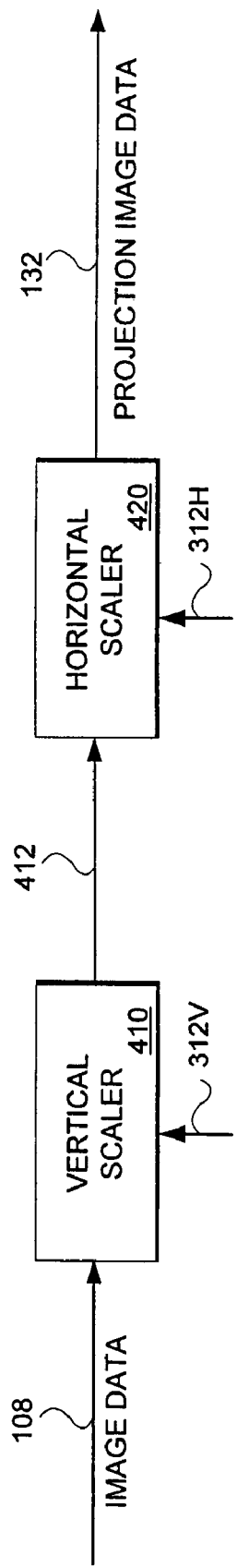
FIG. 4 is a block diagram embodiment of the keystone controller shown in FIG. 3.

FIG. 4 is a block diagram embodiment of the keystone corrector 400 shown in FIG. 3. Referring to FIG. 4, the keystone corrector 400 includes a vertical scaler 410 and a horizontal scaler 420. The vertical scaler 410 generates vertically scaled image data 412 by scaling the image data 108 according to vertical scaling values 312V. The vertical scaler 410 provides the vertically scaled image data 412 to the horizontal scaler 420. The horizontal scaler 420 horizontally scales the vertically scaled image data 412 according to the horizontal scaling values 312H to generate the projection image data 132. Although FIG. 4 shows the keystone corrector 400 performing vertical scaling prior to the horizontal scaling, in some embodiments the vertical and horizontal scaling may overlap, be performed simultaneously, and/or have their order reversed.

Referring back to FIG. 3, the keystone driver 310 generates the keystone scaling values 312 according to input values 322. In some embodiments, the input values 322 may be stored in keystone tables 320-1 to 320-N for at least one configuration of the projection system 200. For instance, keystone table 320-1 may hold input values 322 associated with a first type of lens, or a first zoom position used by the projection device 260 (FIG. 2), while the other keystone tables 320-2 to 320-N may store input values 322 for other lens types or zoom positions. In some embodiments, the keystone driver 310 generates the keystone scaling values 312 according to input values 322 without storing the input values 322 to one or more of the keystone tables 320-1 to 320-N. The input values 322 may include a plurality of corners of the keystone corrected image, and a plurality of centers along the edges of either the keystone corrected image or the distorted image. In some embodiments, the input values 322 may include or identify a rotation angle of the projection system 200. When the input values 322 identify a rotation angle of the projection system 200, the keystone driver 310 may determine which keystone table 320-1 to 320-N is associated with the rotation angle of the input values 322 and retrieve the corners and centers responsive to the rotation angle. The keystone driver 310 may dynamically calculate the keystone scaling values 312 from the input values 322, e.g., the corners and the centers of the edges, as opposed to pre-calculating the keystone scaling values 312. Although the keystone tables 320-1 to 320-N are shown separately, in some embodiments they may be incorporated into one or more common memory devices.

Figure 5B:
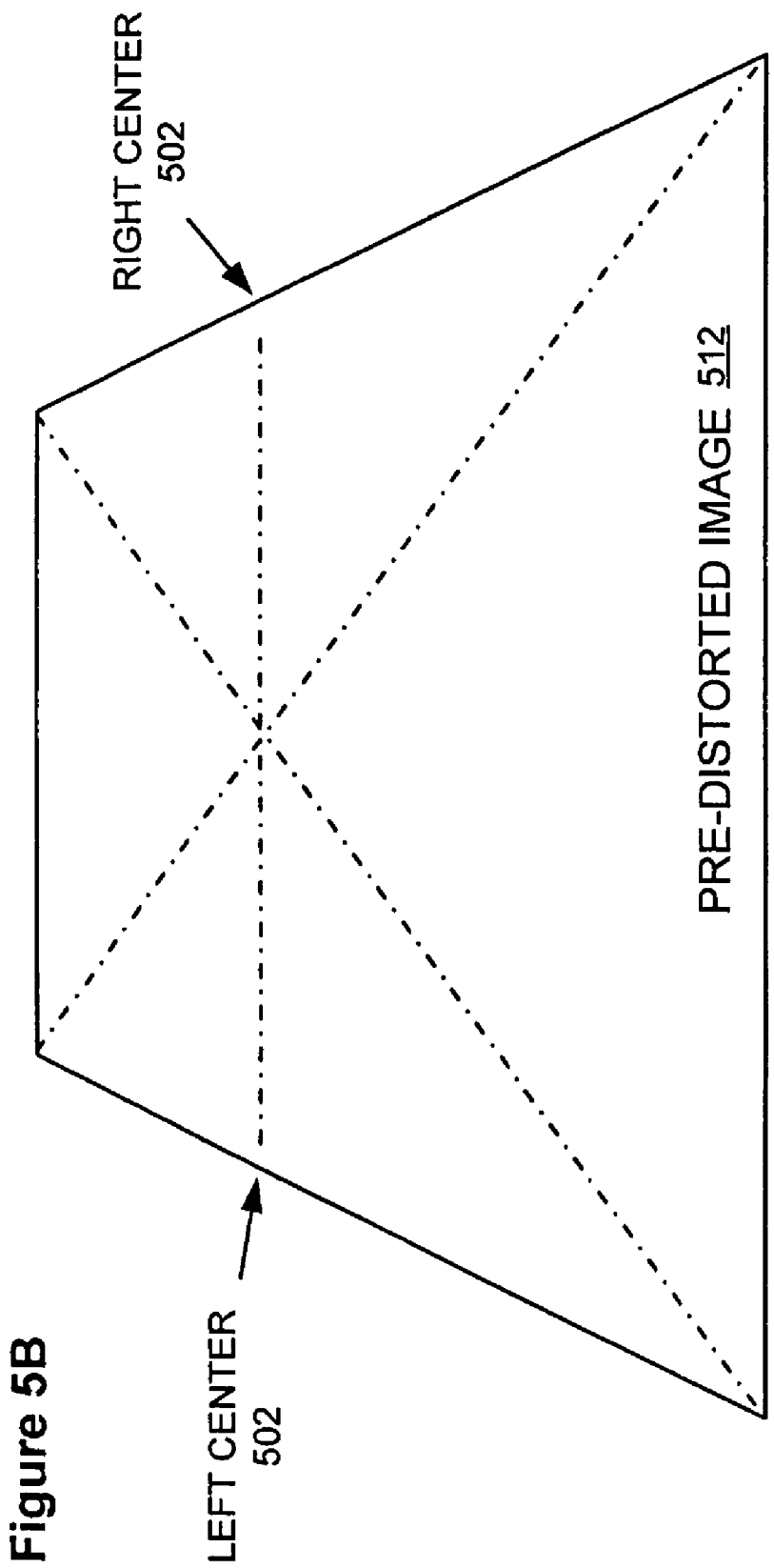
Figure 5C:
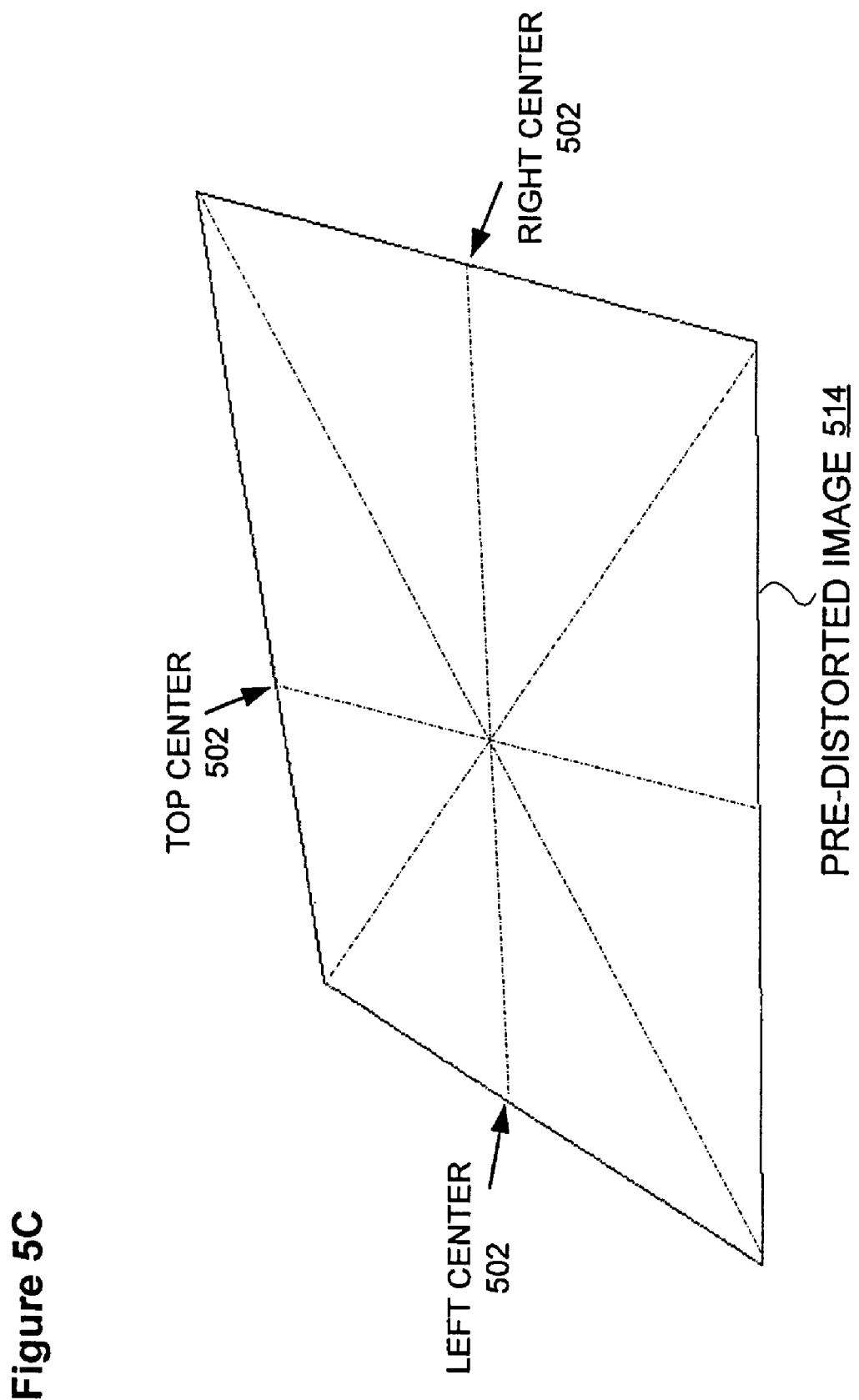

FIGS. 5A-5C are graphical diagrams illustrating the input values 322 shown in FIG. 3. Referring to FIG. 5A, a projection surface 114 is cast with a distorted image 510 having a plurality of edge-centers 502, such as a top edge-center, a bottom edge-center, a left edge-center, and a right edge-center. For instance, the top edge-center 502, located along the upper edge of the distorted image 510, may indicate a center point of the image between the upper left and right corners. The distorted image 510 may be a projection of the image data 108 that has not been keystone corrected by keystone corrector 400.

A keystone corrected image 520 may be a keystone corrected projection of the distorted image 510. The keystone corrected image 520 has a plurality of corners 504 that may be within the projection of the distorted image 510. The input values 322 may include a plurality of the edge-centers 502 associated with the distorted image 510 and a plurality of the corners 504 associated with the keystone corrected image 520. In some embodiments, the keystone tables 320-1 to 320-N (FIG. 3) may store all four corners 504 of the keystone corrected image 520 and three edge-centers 502 of the distorted image 510, while in other embodiments the input values 322 may include various combinations of edge-centers 502 and corners 504.

Referring to FIGS. 5B and 5C, multiple example pre-distorted images 512 and 514 are shown to represent projection image data 132 having undergone pre-distorted by keystone corrector 400, but not yet projected on a projection surface 114. Although the pre-distorted images 512 and 514 appear distorted, when projected on the projection surface 114, the resulting keystone corrected image will appear rectangular or keystone corrected. The pre-distorted images 512 and 514 may be stored in the projection system 200 prior to projection on the projection surface 114. Referring back to FIG. 3, the keystone driver 310 generates keystone scaling values 312 responsive to the input values 322. The keystone scaling values 312 may include horizontal and vertical scaling values and horizontal and vertical increment values. For instance, the vertical scaling values may identify a height (top-bottom) ratio between the distorted image 510 (FIG. 5) and keystone corrected image 520 (FIG. 5), while the horizontal scaling values may identify a length (left-right) ratio between the distorted image 510 (FIG. 5) and keystone corrected image 520 (FIG. 5). The horizontal and vertical increment values may identify scaling increments applied to the image data 108, allowing the keystone corrector 400 to maintain the aspect ratio of the image data 108 in the keystone corrected image (FIG. 5). When the aspect ratio of the image data 108 is not maintained during keystone correction, the shape or edges of the keystone corrected image 520 (FIG. 5) will appear correct because the corners are known, but the internal portions may appear distorted or misshapen.

By using the input values 322, the keystone driver 310 may generate the keystone scaling values 312 on-the-fly, or in real time, instead of through complicated pre-calculation as described above. This, in turn, allows the keystone controller 300 to stream keystone scaling values 312 to the keystone corrector 400 and to dynamically switch among the input values 322 within the keystone tables 320-1 to 320-N. Since the keystone controller 300 may store multiple input values 322 in the keystone tables 320-1 to 320-N, the projection system 200 may be reconfigured without undue delay resulting from complicated pre-calculation. The operation of the keystone driver 310 will be described below in greater detail.

The keystone controller 300 may include an interface to provide the keystone driver 310 with the input values 322. The interface 330 may determine the input values 322 automatically, from user input, or both. For instance, the interface 330 may be a graphical user interface (GUI) for receiving user input. In some embodiments, the interface 330 may include automatically receive the input values 322 from a source internal or external to the projection system 200. The keystone driver 310 may store the input values 322 from the interface 330 to at least one of the keystone tables 320-1 to 320-N for use in generating the keystone scaling values 312.

The interface 330 may also provide orientation data 332 to the keystone driver 310. The orientation data 332 may correspond to one or more sets of the input values 322. For instance, the orientation data 332 may identify a set of input values 322 that corresponds to a particular lens or zoom position of the projection system 200. The keystone driver 310 may store or retrieve sets of input values 322 from the keystone tables 320-1 to 320-N responsive the orientation data 332. When the keystone driver 310 is retrieving input values 322 for a particular configuration of the projection system 200 (FIG. 2), the orientation data 332 may indicate which keystone table 320-1 to 320-N holds the input values 322.

Figure 6:
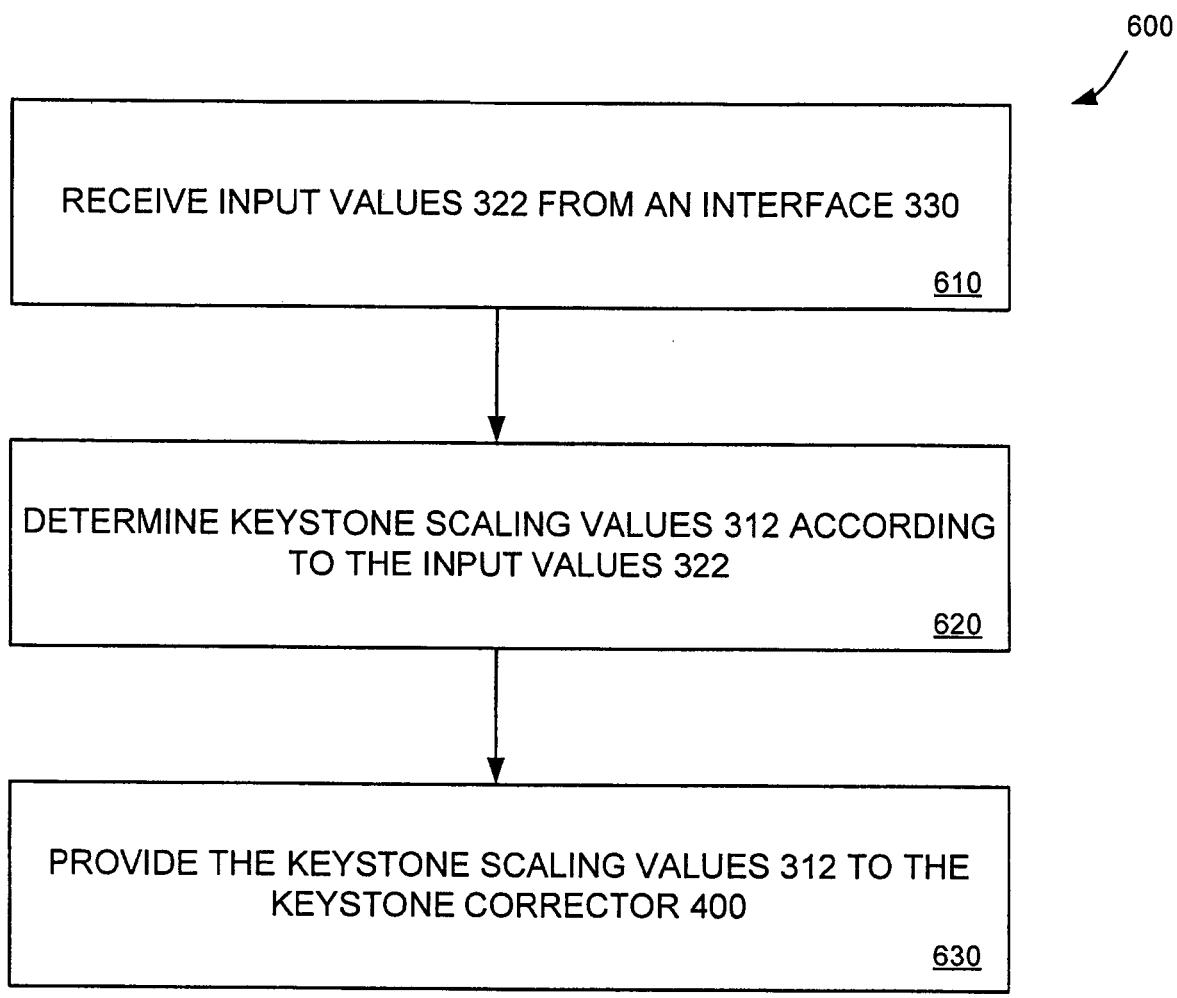
FIG. 6 is a flowchart illustrating operational embodiments of the keystone driver shown in FIG. 3.

FIG. 6 is a flowchart 600 illustrating operational embodiments of the keystone driver 310 shown in FIG. 3. Referring to FIG. 6, in a block 610, the keystone driver 310 receives input values 322 from an interface 330. The interface 330 may receive the input values 322 manually, automatically, or semi-automatically. The input values 322 may correspond to a specific configuration of the projection system 200 (FIG. 2), such as the use of a specific lens or zoom position, or an orientation of the projection system 200 (FIG. 2) relative to the projection surface 114 (FIG. 1), or both. In some embodiments, the keystone driver 310 may receive orientation data 332 that indicates which configuration and/or orientation are associated with the input values 322. In a block 620, the keystone driver 310 determines keystone scaling values 312 according to the input values 322. As described above, the input values 322 may include a plurality of corners of a keystone corrected image 520 (FIG. 5) and a plurality of centers along the edges of a distorted image 510 (FIG. 5). The keystone driver 310 may retrieve the input values 322 from a keystone table 320-1 to 320-N to determine the keystone scaling values 312. For instance, when the input values 322 identify a rotation angle of the projection system 200, the keystone driver 310 may determine which keystone table 320-1 to 320-N is associated with the rotation angle of the input values 322 and retrieve the corners and centers responsive to the rotation angle. The keystone scaling values 312 may include a vertical scaling value (VerticalScaler), a vertical increment value (VerticalScalingIncrement), a horizontal scaling value (HorizontalScaler), and a horizontal increment value (HorizontalScalingIncrement). As shown below in Equations 1 and 2, the keystone driver 310 may determine the vertical scaling value (VerticalScaler) and vertical increment value (VerticalScalingIncrement) from the input values 322.

$$InputHeight = \\ VerticalScaler + \frac{OutputHeight(OutputHeight-1)}{2} \times \\ VerticalScalingIncrement$$

Equation 1

$$InputCenter = OutputCenter \times VerticalScaler + \\ \frac{OutputCenter(OutputCenter-1)}{2} \times \\ VerticalScalingIncrement$$

Equation 2

The InputHeight and InputCenter are associated with the distorted image 510 (FIG. 5), while the OutputHeight and OutputCenter are associated with the keystone corrected image 520 (FIG. 5). For instance, InputHeight may be the height (top-to-bottom) of the distorted image 510, and the InputCenter may be the height (center-to-bottom or top-to-center) to the center of an edge of the distorted image 510. The OutputHeight may be the height (top-to-bottom) of the keystone corrected image 520, and the OutputCenter may be the height (center-to-bottom or top-to-center) to the center of an edge of the keystone corrected image 520. The keystone driver 310 may derive the InputHeight, OutputHeight, InputCenter and OutputCenter from the input values 322, e.g., the corners 504 (FIG. 5) of the keystone corrected image 520 and the edge-centers 502 (FIG. 5) of the distorted image 510 or the keystone corrected image 520 (FIG. 5). Since there are two equations, Equations 1 and 2, with two unknowns, the vertical scaling value (VerticalScaler) and vertical increment value (VerticalScalingIncrement), the keystone driver 310 may compute the vertical scaling value (VerticalScaler) and vertical increment value (VerticalScalingIncrement) from Equations 1 and 2.

Similarly, as shown below in Equations 3 and 4, the keystone driver 310 may determine the horizontal scaling value (HorizontalScaler) and horizontal increment value (HorizontalScalingIncrement) from the input values 322.

$$InputLength = HorizontalScaler + \frac{OutputLength(OutputLength-1)}{2} \times HorizontalScalingIncrement$$

Equation 3

$$InputCenter = OutputCenter \times HorizontalScaler + \frac{OutputCenter(OutputCenter-1)}{2} \times HorizontalScalingIncrement$$

Equation 4

Since Equations 3 and 4 each have two unknowns, the horizontal scaling value (HorizontalScaler) and horizontal increment value (HorizontalScalingIncrement), the keystone driver 310 may compute the horizontal scaling value (HorizontalScaler) and horizontal increment value (HorizontalScalingIncrement) according to the InputHeight, OutputHeight, InputCenter and OutputCenter derived above.

In a block 630, the keystone driver 310 provides the keystone scaling values 312 to the keystone corrector 400. The keystone corrector 400 generates the projection image data 132 from the keystone scaling values 312. The keystone corrector 400 includes keystone correction functionality to predistort the image data 108 according to the keystone scaling values 312 and thus generate the projection image data 132. In some embodiments, the keystone corrector 400 may interpolate the vertical scaling value (VerticalScaler), the vertical increment value (VerticalScalingIncrement), the horizontal scaling value (HorizontalScaler), and the horizontal increment value (HorizontalScalingIncrement) to maintain a correct aspect ratio in the keystone corrected image 520 (FIG. 5). In other embodiments, the keystone driver 310 may interpolate the vertical scaling value (VerticalScaler), the vertical increment value (VerticalScalingIncrement), the horizontal scaling value (HorizontalScaler), and the horizontal increment value (HorizontalScalingIncrement) prior to providing the interpolated data to the keystone corrector 400.

Having illustrated and described the principles of our invention, it should be readily apparent to those skilled in the art that the invention may be modified in arrangement and detail without departing from such principles. We claim all modifications coming within the spirit and scope of the accompanying claims.

I claim the following:

1. A method comprising:

identifying input values associated with an image projected by a projection system on a projection surface, the input values including a rotation angle of the projection system, one or more center-points located on edges of a distorted image projection, and a plurality of corners within the distorted image projection, the corners corresponding to an undistorted projection of the image;

a keystone driver determining a vertical scaling value VerticalScaler, a vertical increment value VerticalScalingIncrement, a horizontal scaling value HorizontalScaler, and a horizontal increment value HorizontalScalingIncrement based on the input values, wherein the determining comprises applying the following first and second equations:

$$InputHeight = VerticalScaler + \frac{OutputHeight(OutputHeight-1)}{2} \times VerticalScalingIncrement, \text{ and}$$

$$InputCenter = OutputCenter \times VerticalScaler + \frac{OutputCenter(OutputCenter-1)}{2} \times VerticalScalingIncrement,$$

wherein InputHeight comprises a height of the distorted image projection, InputCenter comprises a distance to the center of an edge of the distorted image projection, OutputHeight comprises a height of the undistorted projection of the image, and OutputCenter comprises a distance to the center of an edge of the undistorted projection of the image; and a keystone corrector predistorting the image responsive to the determining and based on the determined vertical scaling value, vertical increment value, horizontal scaling value, and horizontal increment value, the predistorted image exhibiting no distortion and aligning with the plurality of corners when projected on the projection surface.

2. The method of claim 1 where each center-point is located at a mid-point between two adjacent corners of the distorted image projection.

3. The method of claim 1 including storing one or more sets of the input values to at least one keystone table according to orientation data received from an interface, the orientation data to identify a configuration of a projection device; and retrieving the sets of the input values responsive to the orientation data.

4. The method of claim 1 where the orientation data indicates at least one of an orientation of the projection device relative to the projection surface, a type of optical lens to be used to project the image, and a position associated with zoom functionality.

5. The method of claim 1 where at least one of the sets of input values includes center-points associated with three edges of a distorted projection of the image and four corners corresponding to the undistorted projection of the image.

6. The method of claim 1, wherein the determining further comprises applying the following third and fourth equations:

$$InputLength = HorizontalScaler + \frac{OutputLength(OutputLength-1)}{2} \times HorizontalScalingIncrement, \text{ and}$$

$$InputCenter = OutputCenter \times HorizontalScaler + \frac{OutputCenter(OutputCenter-1)}{2} \times HorizontalScalingIncrement,$$

wherein InputLength comprises a length of the distorted image projection and OutputLength comprises a length of the undistorted projection of the image.

7. The method of claim 6 including vertically scaling the image according to the vertical scaling value VerticalScaler and the vertical increment value VerticalScalingIncrement.

8. The method of claim 7 including horizontally scaling the vertically scaled image according to the horizontal scaling value HorizontalScaler and the horizontal increment value HorizontalScalingIncrement.

9. A device comprising:
 an interface to ascertain input values associated with an image projected on the projection surface, the input values including one or more center-points on edges of a distorted projection of the image and including a plurality of corners within the distorted projection of the image, the corners corresponding to an undistorted projection of the image;
 a keystone driver to determine one or more keystone scaling values responsive to the input values, where the keystone driver is adapted to calculate a vertical scaling value VerticalScaler, a vertical increment value VerticalScalingIncrement, a horizontal scaling value HorizontalScaler, and a horizontal increment value HorizontalScalingIncrement responsive to the corners and the center-points using the following first and second equations:

$$InputHeight = VerticalScaler + \frac{OutputHeight(OutputHeight-1)}{2} \times VerticalScalingIncrement, \text{ and}$$

$$InputCenter = OutputCenter \times VerticalScaler + \frac{OutputCenter(OutputCenter-1)}{2} \times VerticalScalingIncrement,$$

wherein InputHeight comprises a height of the distorted image projection, InputCenter comprises a distance to the center of an edge of the distorted image projection, OutputHeight comprises a height of the undistorted projection of the image, and OutputCenter comprises a distance to the center of an edge of the undistorted projection of the image; and
 a keystone corrector to predistort the image responsive to the keystone scaling values, the predistorted image exhibiting no distortion and aligning with the plurality of corners when projected on the projection surface, wherein the keystone corrector comprises:
  a vertical scaler to vertically scale the image according to the vertical scaling values; and
  a horizontal scaler to horizontally scale the vertically scaled image according to the horizontal scaling values.

10. The device of claim 9 where each center-point is located at a mid-point between two adjacent corners of the distorted projection of the image.

11. The device of claim 9 includes one or more keystone tables to store at least one set of the input values, where the keystone driver stores and retrieves the input values according to orientation data received from the interface, the orientation data to identify a configuration of a projection device.

12. The device of claim 11 where the orientation data indicates at least one of an orientation of the projection device relative to the projection surface, a type of optical lens to be used to project the image, and a position associated with zoom functionality.

13. The device of claim 9
 where the keystone driver is adapted to interpolate the keystone scaling values; and
 where keystone corrector is adapted to predistort the image responsive to the interpolated keystone scaling values.

14. The device of claim 9, wherein the keystone driver is further adapted to calculate VerticalScaler, VerticalScalingIncrement, HorizontalScaler, and HorizontalScalingIncrement using the following third and fourth equations:

$$InputLength = HorizontalScaler + \frac{OutputLength(OutputLength-1)}{2} \times HorizontalScalingIncrement, \text{ and}$$

$$InputCenter = OutputCenter \times HorizontalScaler + \frac{OutputCenter(OutputCenter-1)}{2} \times HorizontalScalingIncrement,$$

wherein InputLength comprises a length of the distorted image projection and OutputLength comprises a length of the undistorted projection of the image.

15. An apparatus including a computer-readable medium containing instructions, when executed by a processor or multiple communicating processors, perform a method comprising:
 identifying input values associated with an image projected on a projection surface, the input values including one or more center-points on edges of a distorted projection of the image and including a plurality of corners within the distorted projection of the image, the corners corresponding to an undistorted projection of the image;
 determining a vertical scaling value VerticalScaler, a vertical increment value VerticalScalingIncrement, a horizontal scaling value HorizontalScaler, and a horizontal increment value HorizontalScalingIncrement based on the input values, wherein the determining comprises applying the following first and second equations:

$$InputHeight = VerticalScaler + \frac{OutputHeight(OutputHeight-1)}{2} \times VerticalScalingIncrement, \text{ and}$$

$$InputCenter = OutputCenter \times VerticalScaler + \frac{OutputCenter(OutputCenter-1)}{2} \times VerticalScalingIncrement,$$

wherein InputHeight comprises a height of the distorted image projection, InputCenter comprises a distance to the center of an edge of the distorted image projection, OutputHeight comprises a height of the undistorted projection of the image, and OutputCenter comprises a distance to the center of an edge of the undistorted projection of the image; and
 predistorting the image responsive to the determining and based on the determined vertical scaling value, vertical increment value, horizontal scaling value, and horizontal increment value, the predistorted image exhibiting no distortion and aligning with the plurality of corners when projected on the projection surface.

16. The apparatus of claim 15 where each center-point is located at a mid-point between two adjacent corners of the distorted projection of the image.

17. The apparatus of claim 15 including
calculating vertical scaling values responsive to the corners and the center-points; and
vertically scaling the image according to the vertical scaling values.

18. The apparatus of claim 17 including
calculating horizontal scaling values responsive to the corners and the center-points; and
horizontally scaling the vertically scaled image according to the horizontal scaling values.

19. The apparatus of claim 15 including
storing one or more sets of the input values to at least one keystone table according to orientation data received from an interface, the orientation data to identify a configuration of a projection device; and
retrieving the sets of the input values responsive to the orientation data.

20. The apparatus of claim 15 where the orientation data indicates at least one of an orientation of the projection device relative to the projection surface, a type of optical lens to be used to project the image, and a position associated with zoom functionality.

21. The apparatus of claim 15 where at least one of the sets of input values includes center-points associated with three edges of a distorted projection of the image and four corners corresponding to the undistorted projection of the image.

22. The apparatus of claim 15, wherein the determining further comprises applying the following third and fourth equations:

$$InputLength = HorizontalScaler +$$
$$\frac{OutputLength(OutputLength - 1)}{2} \times HorizontalScalingIncrement, \text{ and}$$
$$InputCenter = OutputCenter \times HorizontalScaler +$$
$$\frac{OutputCenter(OutputCenter - 1)}{2} \times HorizontalScalingIncrement,$$

wherein InputLength comprises a length of the distorted image projection and OutputLength comprises a length of the undistorted projection of the image.

23. A device comprising:
means for identifying input values associated with an image projected on a projection surface, the input values including one or more center-points on edges of a distorted projection of the image and including a plurality of corners within the distorted projection of the image, the corners corresponding to an undistorted projection of the image;
means for determining vertical scaling value VerticalScaler, a vertical increment value VerticalScalingIncrement, a horizontal scaling value HorizontalScaler, and a horizontal increment value HorizontalScalingIncrement based on the input values, wherein the means for determining comprises applying the following first and second equations:

$$InputHeight = VerticalScaler +$$
$$\frac{OutputHeight(OutputHeight - 1)}{2} \times VerticalScalingIncrement, \text{ and}$$
$$InputCenter = OutputCenter \times VerticalScaler +$$
$$\frac{OutputCenter(OutputCenter - 1)}{2} \times VerticalScalingIncrement,$$

wherein InputHeight comprises a height of the distorted image projection, InputCenter comprises a distance to the center of an edge of the distorted image projection, OutputHeight comprises a height of the undistorted projection of the image, and OutputCenter comprises a distance to the center of an edge of the undistorted projection of the image; and
means for predistorting the image responsive to the determining and based on the determined vertical scaling value, vertical increment value, horizontal scaling value, and horizontal increment value, the predistorted image exhibiting no distortion and aligning with the plurality of corners when projected on the projection surface.

24. The method of claim 23 where each center-point is located at a mid-point between two adjacent corners of the distorted projection of the image.

25. The method of claim 23 including
means for calculating vertical scaling values responsive to the corners and the center-points; and
means for vertically scaling the image according to the vertical scaling values.

26. The method of claim 25 including
means for calculating horizontal scaling values responsive to the corners and the center-points; and
means for horizontally scaling the vertically scaled image according to the horizontal scaling values.

27. The method of claim 23 including
means for storing one or more sets of the input values to at least one keystone table according to orientation data received from an interface, the orientation data to identify a configuration of a projection device; and
means for retrieving the sets of the input values responsive to the orientation data.

28. The method of claim 23 where the orientation data indicates at least one of an orientation of the projection device relative to the projection surface, a type of optical lens to be used to project the image, and a position associated with zoom functionality.

29. The method of claim 23 where at least one of the sets of input values includes center-points associated with three edges of a distorted projection of the image and four corners corresponding to the undistorted projection of the image.

30. The device of claim 23, wherein the means for determining further comprises applying the following third and fourth equations:

$$InputLength = HorizontalScaler +$$
$$\frac{OutputLength(OutputLength - 1)}{2} \times HorizontalScalingIncrement, \text{ and}$$
$$InputCenter = OutputCenter \times HorizontalScaler +$$
$$\frac{OutputCenter(OutputCenter - 1)}{2} \times HorizontalScalingIncrement,$$

wherein InputLength comprises a length of the distorted image projection and OutputLength comprises a length of the undistorted projection of the image.

* * * * *

UNITED STATES PATENT AND TRADEMARK OFFICE
CERTIFICATE OF CORRECTION

PATENT NO.       : 7,705,862 B1                                        Page 1 of 1
APPLICATION NO.  : 11/532358
DATED            : April 27, 2010
INVENTOR(S)      : Tianbing Brian Teng It is certified that error appears in the above-identified patent and that said Letters Patent is hereby corrected as shown below:

Please replace paragraph (63) on the face of the patent with the following:
-- Continuation-in-part of application No. 10/753,833, filed on Jan. 5, 2004, now abandoned, and a continuation-in-part of application No. 10/723,002, filed on Nov. 26, 2003, now Pat. No. 7,380,946, and a continuation-in-part of application No. 10/832,488, filed on Apr. 26, 2004, now Pat. No. 7,808,513, and said application No. 10/753,833 claims the benefit of application No. 60/443,422, filed on Jan. 28, 2003, and said application No. 10/723,002 claims the benefit of application No. 60/443,422, filed on Jan. 28, 2003 --;

Column 11, line 52, the words "determining vertical" should be replaced with
-- determining a vertical --.

Signed and Sealed this
Fourth Day of September, 2012

David J. Kappos
*Director of the United States Patent and Trademark Office*